Patented Feb. 26, 1935

1,992,202

UNITED STATES PATENT OFFICE 1,992,202

COATING COMPOSITION

Abraham P. Furman, Bronx, N. Y., assignor to Ira Furman, Charlotte, N. C.

No Drawing. Application January 25, 1932, Serial No. 588,808

25 Claims. (Cl. 41—38.6)

The invention relates to a fibroin composition adapted for the coating of materials, to a process for utilizing the composition as a coating material and to a coated material so produced, and includes correlated improvements and discoveries whereby the use of a fibroin-containing composition is enhanced.

An object of the invention is to provide a composition adapted for the coating of various materials and containing fibroin in a suitable solvent medium.

A further object of the invention is to provide a sheet of fibrous, porous material impregnated and/or coated with a fibroin-containing composition, and a process whereby such sheet may be produced.

A more particular object of the invention is to provide a stencil sheet of the so-called "dry process" type which is suitable for use one a mimeograph or other stencil-duplicating machine, such sheet being stable throughout an extended period of time and capable of receiving type impressions, whether from a typewriter or stylus without a previous moistening or other treatment.

Another object is to provide a stencil sheet comprising an open, porous base, such as yoshino, coated with a fibroin composition, giving a sheet that is impermeable to ink and which is substantially unaffected by temperature changes.

Other objects of the invention will in part be obvious and will in part appear hereinafter.

The invention accordingly comprises the several steps and the relation of one or more of such steps with respect to each of the others, and the products possessing the features, properties, and the relation of constituents, which are exemplified in the following detailed disclosure, and the scope of the invention will be indicated in the claims.

In the practice of the invention there may be prepared a coating composition comprising fibroin dissolved in an ammoniacal metallic salt solution, such as an ammoniacal copper, nickel, zinc, cadmium, cobalt, etc. solution. The preparation of the ammoniacal solution may be effected by dissolving the fibroin as silk, either in the degummed pure condition, or with retention of the sericin content in a solution prepared from copper sulfate, a caustic alkali as caustic soda, or caustic potash, and ammonia. To the ammoniacal solution thus prepared there may then be added a softening agent in the nature of a plasticizer, for which purpose utilization may be made of various materials, for example, oleaginous materials such as castor oil, rapeseed oil, almond oil, peanut oil, etc., and other compounds possessing the property of softening or plasticizing the final coating, as glycerine, tri-phenyl phosphate, tricresyl phosphate, chlorinated naphthalene, esters of poly-basic acids such as the ethyl, butyl, propyl, and amyl esters of phthalic and tartaric acids.

In order to augment the body of the composition and to provide a setting agent there may be added various waxes and gums, such as beeswax, which are preferably saponified prior to their addition. The compositions thus prepared will vary in color, depending upon the metallic salt used. Accordingly, the color may be a purple, greenish blue, a light green, or different shades of these colors. Further, there may be added color-imparting materials, as pigments and dyes which are soluble in the compositions set forth. These color-imparting materials may be added to the fibroin composition or may be applied to the coated material as by spraying, brushing, or dipping. The fibroin introduced into the composition may be obtained from any suitable source, such as silk with or without the sericin content. Thus, for example, the process may utilize as its base material silk in the form of waste, as obtained either in the unreeling of the cocoons or in the manufacture of yarns, threads, and fabrics from silk.

As illustrative embodiments of a manner in which the invention may be carried out in practice, the following examples are presented. The parts are by weight. The examples hereinbelow given describe a composition which may contain as an ingredient a wax composition in the form of saponified beeswax. This saponified beeswax may be produced by boiling a mixture containing 200 parts of water, 15 parts potassium carbonate and 100 parts of yellow beeswax until the saponification takes place and a smooth product is obtained. The potassium carbonate mentioned is merely illustrative and in its place other saponifying agents as sodium carbonate, borax, sodium bicarbonate and potassium bicarbonate may be used.

Example I 5 parts of copper sulfate are dissolved in about 20 parts of water, and 3 parts of sodium hydroxide dissolved in 10 parts of water are added. 3 parts of aqueous ammonia of 26° Baumé are added and into the mixture so obtained there is introduced about 5 parts of fibroin as a pure degummed silk or as a silk retaining its gum content. There is then added about 20 parts castor oil and about 40 parts saponified beeswax. If desired, a pigment or soluble dye may be added in a quantity and of a color to give the desired shade, or the color may be applied by spraying, dipping, or brushing after coating.

Example II 13 parts of pure copper hydroxide in suspension in water containing 10.8% copper hydroxide on dry basis are admixed with about 1 part sodium hydroxide dissolved in 20 parts of water, about 2 parts aqueous ammonia of 26° Baumé and to the solution so obtained there is added about 5 parts of fibroin. As softening and setting agents there may then be added about 4 parts glycerine, 15 parts castor oil, and 40 parts saponified wax. In order to fix the composition and to render the coating insoluble in water there may be added about 15 parts of a solution of ammonium chloride saturated at about 25° C. The addition of the ammonium chloride solution effects a change in color from a purple to a greenish blue. If other color is desired, pigments or dyes may be added, in a quantity and of a color to give the desired shade, or the color may be applied by spraying, dipping, or brushing after coating.

Example III 30 parts of pure copper hydroxide in water suspension containing about 10.8% copper hydroxide on dry basis are admixed with about 30 parts aqueous ammonia of about 26° Baumé and about 7 parts of fibroin. To the composition thus made there is added about 20 parts of castor oil and about 40 parts saponified wax. This composition may be fixed or rendered insoluble in water by the addition of an ammonium chloride solution thereto in the manner set forth in Example II. The composition may be colored in like manner by the addition of a pigment or soluble dye, in a quantity and of a color to give the desired shade, or the color may be applied by spraying, dipping, or brushing after coating.

Example IV

A solution containing about 4 parts of nickel sulfate, about 22 parts of water and about 8 parts of aqueous ammonia of about 26° Baumé is prepared. Another solution is made containing about 2 parts sodium hydroxide dissolved in 10 parts of water. Into the first described solution there is introduced about 5 parts of fibroin, which is fully immersed, and then there is added the second described solution. The fibroin dissolves yielding a solution having a deep gold color. To this solution is added about 20 parts of castor oil and about 40 parts of saponified beeswax and about 15 parts of a saturated solution of ammonium chloride. The color changes from a golden yellow to a light green. If other shades are desired, suitable pigments of dyes may be incorporated, or the color may be applied by spraying, dipping, or brushing after coating.

The foregoing examples set forth compositions containing certain specific quantities and concentrations of ingredients. It will be realized that the invention in its broad aspects is not limited to the specific ingredients, quantities thereof, and conditions set forth in these examples, and that such ingredients, quantities, and conditions may be varied considerably without departing from the scope of the invention. Thus, potassium hydroxide may be used in place of sodium hydroxide. The sulfates of nickel and copper may be replaced by other salts as the nitrate, carbonate, chloride, etc., and salts of other metals may be used, as of zinc, cobalt and cadmium.

The softening agent may be an emulsified, saponified, or sulfonated oleaginous material of mineral, vegetable, animal, or synthetic origin. Hydrogenated vegetable or animal oils may also be used. Beeswax has been specifically referred to as a setting agent, but it will be understood that other waxes as chinese wax, stearic acid, beef tallow, mutton tallow, japan wax, myrtle wax, palm wax, carnauba wax, milk tree wax, bayberry wax, ceresin wax, paraffin wax, ozokerite, and halowax may be introduced into the fibroin composition in order to impart thereto the desired stability and softening range, so that when it serves as a coating composition it will be unaffected by the usual changes in temperature. The gums that may be used include rosins, Canada and fir tree balsam, and shellac. It is not required that the composition shall be fixed or rendered water insoluble, but it has been found when such fixing or insolubility is desired that it may be attained by the addition of an ammonium salt, preferably in the form of a saturated solution. Instead of the ammonium chloride other ammonium salts may be used, such as the sulfate, nitrate, borate, acetate, etc.

Compositions containing fibroin, as those above particularly described have been found to be well adapted for the impregnation and/or coating of a porous material, and of particular advantage for the production of a stencil sheet. A sheet prepared by impregnating and coating a bibulous paper, as yoshino, may be used for the making of a multiplication of copies by forming characters therein, by impact or pressure, such as by the type of an ordinary typewriter or by means of a stylus. The composition and process described afford an economical procedure for the production of coating materials without the use of solvent materials which are dangerous, either from the standpoint of inflammability or hazardous to health.

A porous material, as sheets of yoshino paper, may be coated with a fibroin composition by application thereof by the familiar drawing process. If desired, any excess composition may be removed by passing over or under a wire or a doctor roll and, after the coating operation, the material may be hung or otherwise put aside for a period of time in order to permit a thorough and substantially uniform impregnation and coating of the base.

The fibroin compositions obtained from a colored metallic salt or of a metallic salt yielding a colored solution with ammonia will be colored corresponding to the color characteristic of the metal used. That is, a composition containing copper will have a purple or greenish-blue color, whereas that from nickel a deep golden color. However, if it is desired to have the composition or coated material substantially colorless, such may be effected by addition to the composition, or treatment of the coated material after the coating operation with a dilute acid solution, as hydrochloric acid, sulfuric acid, nitric acid, phosphoric acid, and acetic acid, and subsequently washing to remove the acid. The treatment with dilute acid is believed to effect the formation of bodies substantially without color, and to permit their removal by solution.

Furthermore, it is desired to point out that the body or toughness of the coating is dependent upon the fibroin content of the composition, and may be either increased or decreased according to the corresponding content of fibroin.

Since certain changes in carrying out the above process, and certain modifications in the products which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A coating composition suitable for the manufacture of stencil sheets comprising a solution of fibroin and a softening agent.

2. A coating composition suitable for the manufacture of stencil sheets comprising a solution of fibroin, a softening agent and a setting agent.

3. A coating composition suitable for the manufacture of stencil sheets comprising an alkaline solution of fibroin and a softening agent.

4. A coating composition suitable for the manufacture of stencil sheets comprising an ammoniacal solution of fibroin and a vegetable oil.

5. A coating composition suitable for the manufacture of stencil sheets comprising an alkaline solution of fibroin, a softening agent and a setting agent.

6. A coating composition suitable for the manufacture of stencil sheets comprising an ammoniacal solution of fibroin, a softening agent and a wax composition.

7. A coating composition suitable for the manufacture of stencil sheets comprising an ammoniacal solution of fibroin, an oleaginous material and a wax composition.

8. A coating composition suitable for the manufacture of stencil sheets comprising an ammoniacal copper solution of fibroin, castor oil and saponified beeswax.

9. A coating composition suitable for the manufacture of stencil sheets comprising an ammoniacal copper solution of fibroin, an oleaginous material, a wax composition and an ammonium salt.

10. A stencil sheet comprising a porous material coated with a composition containing fibroin and a softening agent.

11. A stencil sheet comprising a porous material coated with a composition containing fibroin and a vegetable oil.

12. A stencil sheet comprising a porous material coated with a composition containing fibroin, a softening agent and a setting agent.

13. A stencil sheet comprising a porous material coated with a composition containing fibroin, a softening agent and a saponified wax.

14. A stencil sheet comprising a porous material coated with a composition containing fibroin, a softening agent, and a setting agent.

15. A stencil sheet comprising a porous material coated with a composition containing fibroin, a vegetable oil, and a saponified wax.

16. A stencil sheet comprising a porous material coated with a composition containing an ammoniacal copper solution of fibroin, castor oil and saponified beeswax.

17. A stencil sheet comprising a porous material coated with a composition containing fibroin, a softening agent, and a setting agent, and a color-imparting material.

18. A porous material coated with a composition containing fibroin and a softening agent.

19. A porous material coated with a composition containing fibroin, a softening agent and a setting agent.

20. A process for the production of a stencil sheet which comprises coating a porous material with a composition containing fibroin, and a softening agent.

21. A process for the production of a stencil sheet which comprises coating a porous material with a composition containing fibroin, a softening agent, and a setting agent.

22. A process for the production of a stencil sheet which comprises coating a porous material with a composition containing fibroin, an oleaginous material and a saponified wax.

23. A process for the production of a stencil sheet which comprises coating a porous material with an ammoniacal copper solution of fibroin, castor oil and saponified beeswax.

24. A process for coating a porous material with a composition containing fibroin, a softening agent, a setting agent and a fixing agent.

25. A process for coating a porous material with a composition containing fibroin, a softening agent, a setting agent, and an ammonium salt.

ABRAHAM P. FURMAN.